United States Patent
Conroy

(10) Patent No.: US 6,691,454 B1
(45) Date of Patent: Feb. 17, 2004

(54) SYSTEM FOR REPELLING GARDEN SLUGS

(76) Inventor: John E. Conroy, 106 Stanley Dr., Syracuse, NY (US) 13219

( * ) Notice: Subject to any disclaimer, the term of this patent is extended or adjusted under 35 U.S.C. 154(b) by 0 days.

(21) Appl. No.: 10/215,437

(22) Filed: Aug. 9, 2002

(51) Int. Cl.[7] .............................................. A01M 1/20
(52) U.S. Cl. ........................ 43/132.1; 43/107; 43/131
(58) Field of Search ........................... 43/132.1, 124, 43/107, 131; 52/101; 47/33, 32; 256/72, 24; A01G 00/08, 13/10

(56) References Cited

U.S. PATENT DOCUMENTS

| | | | |
|---|---|---|---|
| 392,347 A | | 11/1888 | Krause |
| 395,678 A | | 1/1889 | Wiebrock |
| 413,507 A | | 10/1889 | Halstead |
| 564,591 A | * | 7/1896 | Clune et al. ................ 256/11 |
| 1,373,827 A | * | 4/1921 | Nelson et al. .............. 43/107 |
| 3,727,840 A | * | 4/1973 | Nigro ......................... 239/43 |
| 3,772,820 A | * | 11/1973 | Bond ......................... 43/131 |
| 4,158,440 A | * | 6/1979 | Sullivan et al. ............. 239/6 |
| 4,281,473 A | * | 8/1981 | Emalfarb et al. ............ 47/33 |
| 4,319,423 A | | 3/1982 | Judd ......................... 43/121 |
| 4,471,562 A | | 9/1984 | Brucker ..................... 43/108 |
| 4,566,219 A | | 1/1986 | Firth ......................... 43/107 |
| 4,644,685 A | * | 2/1987 | Tisbo et al. ................. 47/33 |
| RE32,513 E | * | 10/1987 | Seaber et al. ................ 239/6 |
| 4,756,116 A | | 7/1988 | Cutter ....................... 43/108 |
| 4,826,685 A | * | 5/1989 | Stewart ..................... 424/410 |
| 4,908,977 A | * | 3/1990 | Foster ....................... 43/107 |
| 4,929,634 A | * | 5/1990 | Herman et al. ............. 514/426 |
| 5,015,665 A | * | 5/1991 | Steltenkamp .............. 514/625 |
| 5,170,584 A | * | 12/1992 | Perry ......................... 43/124 |
| 5,242,111 A | * | 9/1993 | Nakoneczny et al. ...... 239/47 |
| 5,296,226 A | * | 3/1994 | Askham ..................... 424/405 |
| 5,390,441 A | | 2/1995 | Pence ....................... 43/131 |
| 5,403,863 A | * | 4/1995 | Hayes et al. ............... 514/717 |
| 5,437,870 A | | 8/1995 | Puritch et al. .............. 424/408 |
| 5,510,110 A | * | 4/1996 | Puritch et al. .............. 424/421 |
| 5,519,970 A | * | 5/1996 | Reum et al. ................ 52/102 |
| 5,672,354 A | * | 9/1997 | Blumberg .................. 424/410 |
| 5,849,284 A | * | 12/1998 | Wilson et al. .............. 424/93.1 |
| 6,021,599 A | * | 2/2000 | Matz .......................... 47/33 |
| 6,041,542 A | * | 3/2000 | Payton et al. .............. 43/131 |
| 6,108,969 A | * | 8/2000 | Danna et al. ................ 47/33 |
| 6,138,405 A | * | 10/2000 | Matz .......................... 47/33 |
| 6,352,706 B1 | * | 3/2002 | Puritch ...................... 424/410 |
| 2002/0086046 A1 | * | 7/2002 | Deitch et al. .............. 424/410 |
| 2002/0136751 A1 | * | 9/2002 | Puritch ...................... 424/410 |
| 2003/0003195 A1 | * | 1/2003 | Heetvelde van et al. .... 426/103 |

FOREIGN PATENT DOCUMENTS

| | | | | |
|---|---|---|---|---|
| CH | 639242 A5 | * | 11/1983 | .......... A01M/25/00 |
| CH | 641321 A5 | * | 2/1984 | .......... A01G/13/10 |
| CH | 687291 A5 | * | 11/1996 | .......... A01G/13/10 |
| DE | 29912840 U1 | * | 5/2000 | .......... A01M/29/00 |
| EP | 353338 A1 | * | 2/1990 | .......... A01G/13/10 |
| EP | 1075789 A2 | * | 2/2001 | .......... A01M/1/20 |
| GB | 2146882 A | * | 5/1985 | .......... A01G/13/10 |
| GB | 2223921 A | * | 4/1990 | .......... A01G/13/10 |
| GB | 2227637 A | * | 8/1990 | .......... A01G/13/10 |
| GB | 2232052 A | * | 12/1990 | .......... A01G/13/10 |
| GB | 2338164 A | * | 12/1999 | .......... A01G/13/10 |

* cited by examiner

Primary Examiner—Peter M. Poon
Assistant Examiner—Joan M. Olszewski
(74) Attorney, Agent, or Firm—Bernhard P. Molldrem, Jr.

(57) ABSTRACT

A slug barrier employs a salt or another non-toxic irritant to gastropods. An elongated flexible edge barrier extends along a margin of the garden, and has a lower edge protruding into the soil and an upper edge extending above the soil. A channel member formed at the upper edge holds a length of wicking material. The wicking material can be a compressed flat synthetic sponge. A paste of salt and other possible minor constituents is charged into the wicking material. The salt is an irritant to garden slugs and snails. Cayenne pepper and garlic juice can be added as know deterrents to a insects and animals such as rabbits. A liquid organic detergent in the paste prevents animals such as deer from licking or biting the sponge. The detergent deters other animals from crossing the barrier.

6 Claims, 1 Drawing Sheet

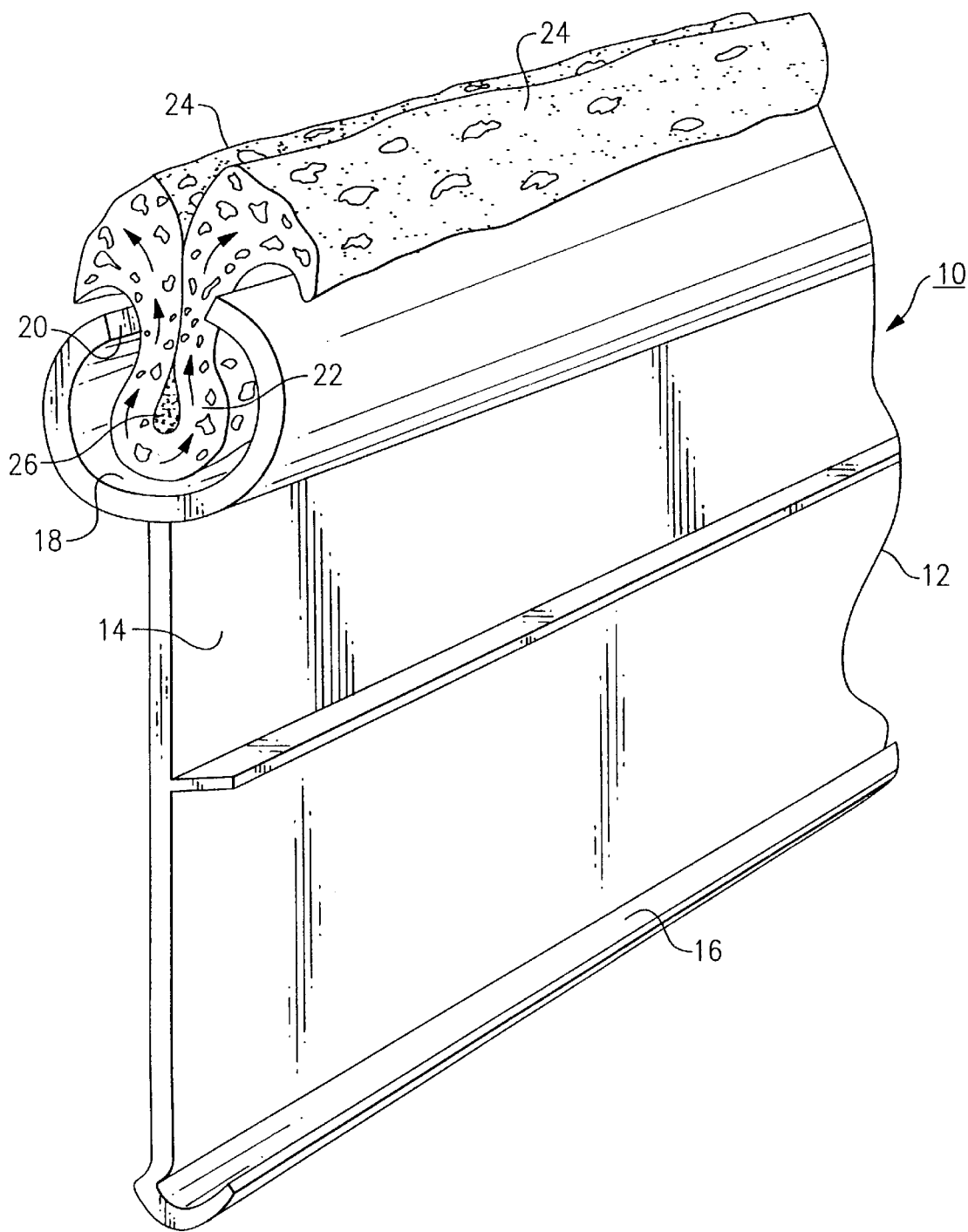

SYSTEM FOR REPELLING GARDEN SLUGS

BACKGROUND OF THE INVENTION

This invention relates to pest control arrangements especially for use in horticultural and gardening environments. The invention is more particularly concerned with a barrier to keep terrestrial gastropods, e.g., slugs and snails, out of a protected region to prevent damage to the plants from the gastropods.

There is a long-standing need for simple and effective means for blocking the entrance of slugs and snails into flower and vegetable gardens. Garden pests, and in particular gastropods such as snails and slugs, cause serious damage to gardens, killing young plants and damaging mature fruits, flowers, and vegetables. Garden slugs cause noticeable damage to leafy vegetables, such as cabbage and lettuce, and to many varieties of ornamental plants such as hosta. Slugs and snails are a problem to gardeners wherever there is moist soil, and thus are a quite prominent problem in the Great Lakes states, the Northeastern states, the Pacific Northwest, and the adjacent Canadian provinces.

Many attempts have been made to control gastropod invasions, but without much success. Typically, slug control arrangements contain an attractant, and attempt to lure the slugs into an area where they can be trapped or poisoned.

In Pence U.S. Pat. No. 5,390,441, an extruded garden stake has a channel and a slot opening, and there is a pest control chemical within the channel and accessible to a gastropod pest through the slot. A snail-attracting molluskicide bait is employed.

Cutter U.S. Pat. No. 4,756,116 shows a snail barrier that uses dissimilar metals to create a galvanic effect making it painful for the gastropod to cross.

Firth U.S. Pat. No. 4,566,219 shows a type of extruded plastic garden barrier fencing that carries a strip of a pesticide.

Other attempts have relied on various mechanical barriers. Some of these had employed barrier fencing for gardens, with a fiber member, i.e., rope, that is soaked in coal oil or tar, examples of which are discussed in Wiebrock U.S. Pat. No. 395,678 and Krause U.S. Pat. No. 392,347.

OBJECTS AND SUMMARY OF THE INVENTION

Accordingly, it is an object of this invention to provide a barrier for slugs and snails that does not draw the gastropods into the garden, but rather employs an irritant that stops the snails and slugs from crossing over into a protected area.

It is another object to: provide a slug and snail barrier that is low maintenance, and does not employ chemicals that are toxic or damaging to the plants in the garden.

All gastropods, i.e., snails and slugs, are sensitive to salt, i.e., sodium chloride. The salt burns their soft bodies. The system of this invention takes advantage of this fact, and dispenses salt though an absorbent, porous wicking material. Each time it rains and whenever the garden is watered, the wicking material becomes wet and draws more of the salt to the upper part of the barrier. This creates an irritant that the slug has to cross to enter the garden, and the slugs and snails will not cross the moist, salty barrier. The barrier arrangement thus comprises an elongated barrier, e.g., an plastic garden edging extrusion or other elongated flexible metal or plastic edge barrier that is adapted to extend along a margin of the garden. This can have a lower edge that protrudes a few inches into the soil and an upper edge that extends above the soil. A channel member is formed at an upper edge which holds a length of the wicking material. A paste of salt and other possible minor constituents is charged into the wicking material, with sufficient moisture and optionally a surfactant and/or a gelling agent to produce a desired consistency. As mentioned before, the salt is an irritant to terrestrial gastropods. Cayenne pepper and garlic juice can be added to the water and salt, as these are know to be deterrents to a number of insects and animals such as rabbits. A variety of other soluble, organic pest deterrents can be added to the system to inhibit destructive activities of other garden pests.

A synthetic compressed sponge material is used here as the wicking material, although other absorbent porous materials could be employed. Preferably the salt is applied in paste form into the sponge which is folded over and stuffed into the slot on the barrier. This provides a reservoir of salt so that each time it rains more of the salt is wicked up to the top edge.

The above and many other objects, features, and advantages of this invention will become apparent to persons skilled in the art from the ensuing description of a preferred embodiment, which is to be read in conjunction with the accompanying Drawing.

BRIEF DESCRIPTION OF THE DRAWING

The sole Drawing FIGURE is a partially cut away perspective view of a slug barrier according to one preferred embodiment of this invention.

DETAILED DESCRIPTION OF THE PREFERRED EMBODIMENT

With reference to the Drawing, an example of the slug barrier 10 according to one embodiment of this invention comprises an elongated extrusion 12 of a garden edging, having a web portion 14 with a footing or anchor 16 in the form of a flange at its lower edge and a round or tubular extruded channel member 18 formed at its upper edge. There may be other stiffening ribs formed along the web portion, as needed for a given application. The extrusion 12 if favorably of a tough, flexible plastic resin so that it can withstand outdoor use, but is flexible enough to follow the contours of the edge of the protected garden. The footing or anchor 16 is situated below the soil surface and the channel 18 is situated above the soil surface so as to create a barrier that pests have to climb over to intrude into the garden. The channel member may be extruded as an elongated rounded bead, which may have a circular or non-circular cross section.

A slit or elongated opening 20 is formed along the round channel member 18, and a wicking member 22 is situated in the channel member 18 with an upper edge portion 24 of the wicking member protruding outward through the slit 20. Favorably, the wicking member is an elongated continuous length of a flat sponge material, i.e., an open-cell absorbent synthetic material, which can be folded over and stuffed into the slit opening 20 of the channel member 18. This contains a fill or charge 26 of an irritant material, i.e., a paste containing salt or an equivalent soluble material that is an irritant to the target pest The paste can be applied as a bead on the sponge material before it is inserted into the slit 20.

After the barrier 10 is installed at the perimeter of the garden, the wicking member 22 is activated by moistening it. This can be the result of a normal watering or sprinkling process, and will also result from natural rainfall and overnight dew. The water is absorbed into the wicking material and this will dissolve some of the salt (and other materials, including, e.g., garlic juice and/or cayenne pepper, or extracts thereof), which migrates up to the exposed upper edge portion 24. This creates a surface that is too saline for garden slugs and snails, but does not affect or irritate the plants or useful garden insects such as bees. The snails and slugs are repelled, and not attracted, and tend to stay clear of the protected areas. Deer tend not to be attracted to the salt due to the detergent contained in the paste, as described below.

The charge 26 of salt paste will survive at least one season and usually more than one without losing the capacity to repel gastropods or other garden pests. The natural irritants are not poisons and do not affect humans who may handle the barrier 10.

A salt-paste charge sufficient for a twenty-foot strip of the wicking member 22 (or sponge) can be made up from one-half pound of non-iodized salt and two teaspoons of cayenne pepper, mixed with two teaspoons of an organic liquid dish detergent. As mentioned before, other pest-irritant ingredients can also be included.

As an alternative, a garden hose or other system can be attached at one end of the tubular channel so that water can be injected for periodically moistening the wicking member. It is also possible to inject saline water, i.e., brine, into the tubular channel on a continual basis, to keep the wicking material moist and sufficiently salty. However, the preferred embodiment described above has been more satisfactory than these alternatives.

While the invention has been described in connection with one preferred embodiment, the person skilled in this art would recognize that the invention is not limited to that embodiment, and that many modifications and variations are possible without departing from the scope and spirit of the invention, as defined in the appended claims.

I claim:

1. Arrangement for deterring terrestrial gastropods from invading a garden; comprising an elongated barrier formed as an extruded garden edging adapted to extend along a margin of the garden, the barrier having a web portion protruding into the soil and having an upper edge, and having a channel member at said upper edge formed as a rounded tubular bead rising above the soil; said tubular bead channel member having an elongated slit therealong on an upper part of the channel member and extending the length of said barrier, the tubular bead channel member having sides that rise from said web portion upper edge to said slit;

a length of wicking material disposed within said tubular bead channel member with at least one edge thereof protruding upward beyond said channel member through said elongated slit; and a fill of a soluble material charged into said wicking material, the soluble material being a non-toxic irritant adapted to repel said terrestrial gastropods.

2. Arrangement according to claim 1 wherein said wicking material includes an open-cell porous material.

3. Arrangement according to claim 2 wherein said porous material includes a sponge.

4. Arrangement according to claim 1 wherein said irritant soluble material includes NaCl.

5. Arrangement according to claim 1 wherein said irritant soluble material is formed as a paste including NaCl and at least one of an organic detergent, cayenne pepper and garlic juice.

6. Arrangement according to claim 1 wherein said irritant soluble material is formed as a paste including NaCl and an organic liquid detergent.

* * * * *